(12) United States Patent
Haraguchi

(10) Patent No.: US 11,702,003 B2
(45) Date of Patent: Jul. 18, 2023

(54) VEHICLE SUN VISOR MODULE

(71) Applicant: KYOWA SANGYO CORP., Toyota (JP)

(72) Inventor: Takashi Haraguchi, Toyota (JP)

(73) Assignee: KYOWA SANGYO CORP., Toyota (JP)

( * ) Notice: Subject to any disclaimer, the term of this patent is extended or adjusted under 35 U.S.C. 154(b) by 0 days.

(21) Appl. No.: 17/856,476

(22) Filed: Jul. 1, 2022

(65) Prior Publication Data

US 2023/0011607 A1   Jan. 12, 2023

(30) Foreign Application Priority Data

Jul. 6, 2021 (JP) .................................. 2021-112296
Dec. 17, 2021 (JP) .................................. 2021-205511

(51) Int. Cl.
*B60Q 3/252* (2017.01)
*B60J 3/02* (2006.01)
*H01H 36/00* (2006.01)

(52) U.S. Cl.
CPC ............ *B60Q 3/252* (2017.02); *B60J 3/0282* (2013.01); *H01H 36/0013* (2013.01)

(58) Field of Classification Search
CPC .... H01H 36/0013; B60J 3/0282; B60Q 3/252
See application file for complete search history.

(56) References Cited

FOREIGN PATENT DOCUMENTS

| DE | 102015109319 A1 | * | 12/2015 | ............... B60Q 3/14 |
| JP | 6763789 B2 | * | 9/2020 | |
| JP | 6763789 B2 | | 9/2020 | |

* cited by examiner

*Primary Examiner* — Anabel Ton
(74) *Attorney, Agent, or Firm* — Bochner PLLC; Andrew D. Bochner

(57) ABSTRACT

A vehicle sun visor module includes a ceiling component, which forms at least part of a ceiling of a vehicle, and a vehicle sun visor module, which is arranged to be adjacent to the ceiling component. The vehicle sun visor includes a visor main body, which is configured to be pivotal relative to the ceiling component between a use position and a retracted position, and a mirror attached to the visor main body. The ceiling component includes a lighting device, which is configured to radiate light into a passenger compartment, and an inductive switch, which turns on the lighting device when set to an ON state and turns off the lighting device when set to an OFF state. The vehicle sun visor includes a magnet that is configured to switch the inductive switch between the ON state and the OFF state.

9 Claims, 15 Drawing Sheets

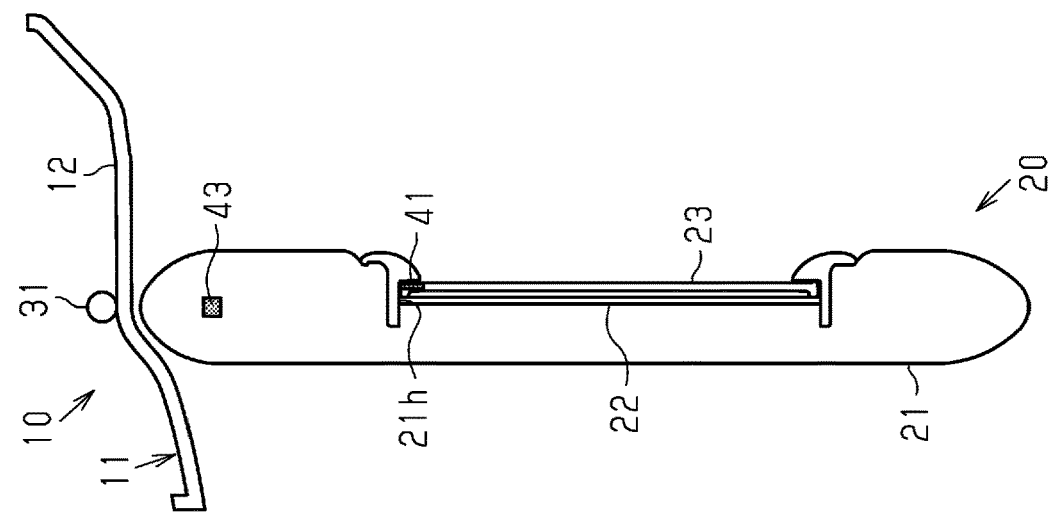
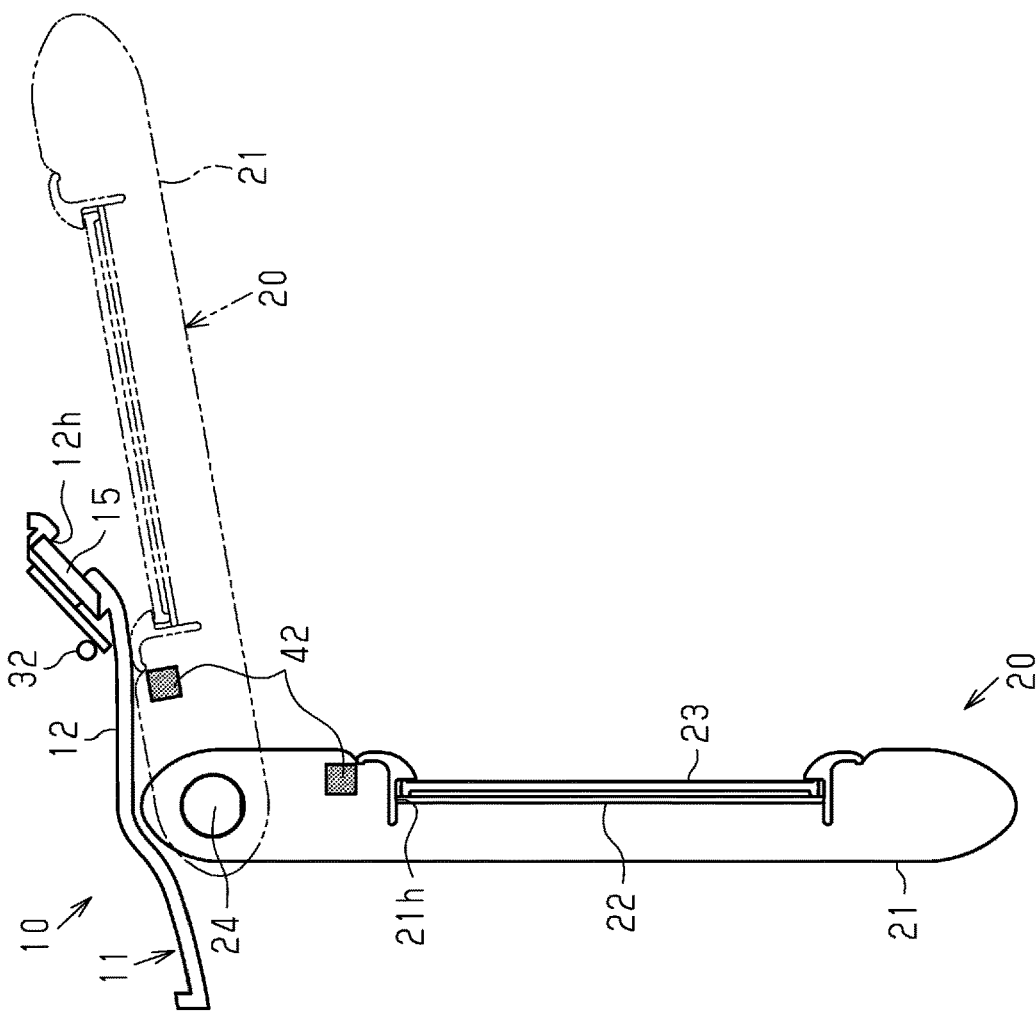

VEHICLE SUN VISOR MODULE

BACKGROUND

1. Field

The present disclosure relates to a vehicle sun visor module.

2. Description of Related Art

A vehicle sun visor is attached to a front portion of a vehicle ceiling. The vehicle sun visor is used to prevent light from outside the vehicle from directly entering the eyes of an occupant in the passenger compartment. In some cases, the vehicle sun visor is arranged adjacent to a ceiling component that forms at least part of the ceiling. In such a case, the vehicle sun visor includes a visor main body that is pivotal between a use position and a retracted position with respect to the ceiling component.

Some visor main bodies are provided with a mirror that is used as a vanity mirror by an occupant. For such a case, a known vehicle sun visor incorporates a lighting device as disclosed in Japanese Patent No. 6763789. The lighting device allows the mirror to be used at night. The lighting device radiates light into the passenger compartment. The vehicle sun visor of the above publication incorporates an inductive switch. The inductive switch turns on the lighting device when set to an ON state, and turns off the lighting device when set to an OFF state.

The lighting device is electrically connected to the power source of the vehicle via the inductive switch. When the inductive switch is set to the ON state, the lighting device is supplied with power from the vehicle power source to be turned on. When the inductive switch is set to the OFF state, the lighting device stops being supplied with the power from the vehicle power source to be turned off.

In a case in which a lighting device and an inductive switch are incorporated in a vehicle sun visor as in the above publication, wires need to be routed, for example, from the ceiling into the visor main body of the vehicle sun visor and electrically connected to the lighting device via the inductive switch. This inevitably elongates the conductive path from the vehicle power source to the lighting device and thus can make the supply of power from the vehicle power source to the lighting device via the wires unstable. Also, only part of the vehicle sun visor is coupled to the ceiling. Therefore, the wires need to be routed from the vehicle ceiling into the visor main body through the limited portion of the vehicle sun visor that is coupled to the ceiling. This complicates the structure of the vehicle sun visor. Accordingly, there is demand for a technique that supplies power to a lighting device in a stable manner and allows the lighting device to be easily turned on and off while simplifying the structure of the vehicle sun visor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle sun visor module includes a ceiling component that forms at least part of a ceiling of a vehicle, and a vehicle sun visor that is arranged to be adjacent to the ceiling component. The vehicle sun visor includes a visor main body configured to be pivotal relative to the ceiling component between a use position and a retracted position, and a mirror attached to the visor main body. The ceiling component includes a lighting device that is configured to radiate light into a passenger compartment, and an inductive switch that is configured to turn on the lighting device when set to an ON state and to turn off the lighting device when set to an OFF state. The vehicle sun visor includes a magnet that is configured to switch the inductive switch between the ON state and the OFF state.

Other features and aspects will be apparent from the following detailed description, the drawings, and the claims.

BRIEF DESCRIPTION OF THE DRAWINGS

FIG. 3 is a schematic diagram showing a state in which the visor main body shown in FIG. 1 is in the use position.

FIG. 4 is a schematic diagram showing a state in which the visor main body shown in FIG. 1 is in the use position.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle sun visor module 10 according to one embodiment will now be described with reference to FIGS. 1 to 5.

Overall Configuration of Vehicle Sun Visor Module 10

Figure 1:
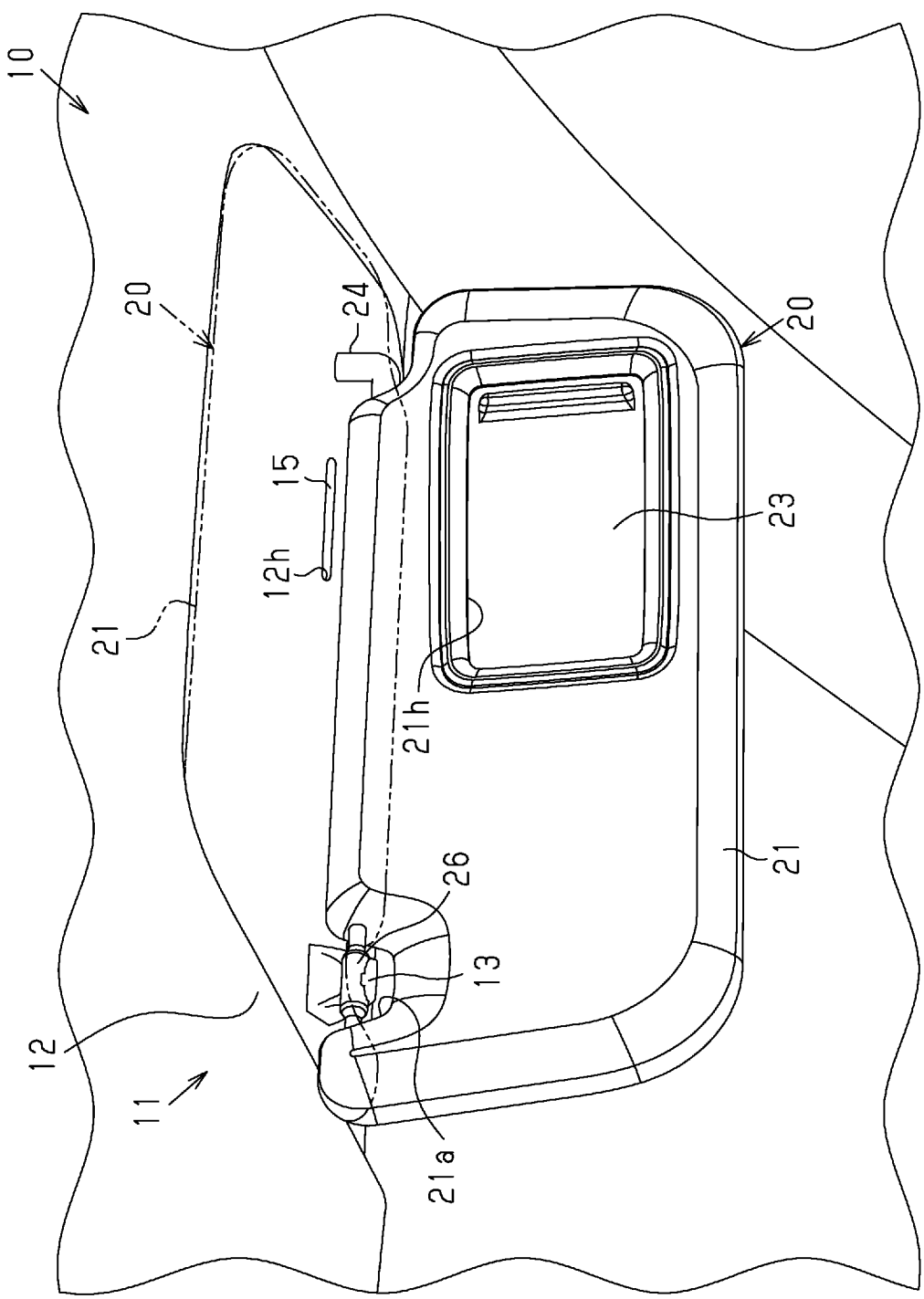
FIG. 1 is a perspective view illustrating a vehicle sun visor module according to one embodiment.
Figure 2:
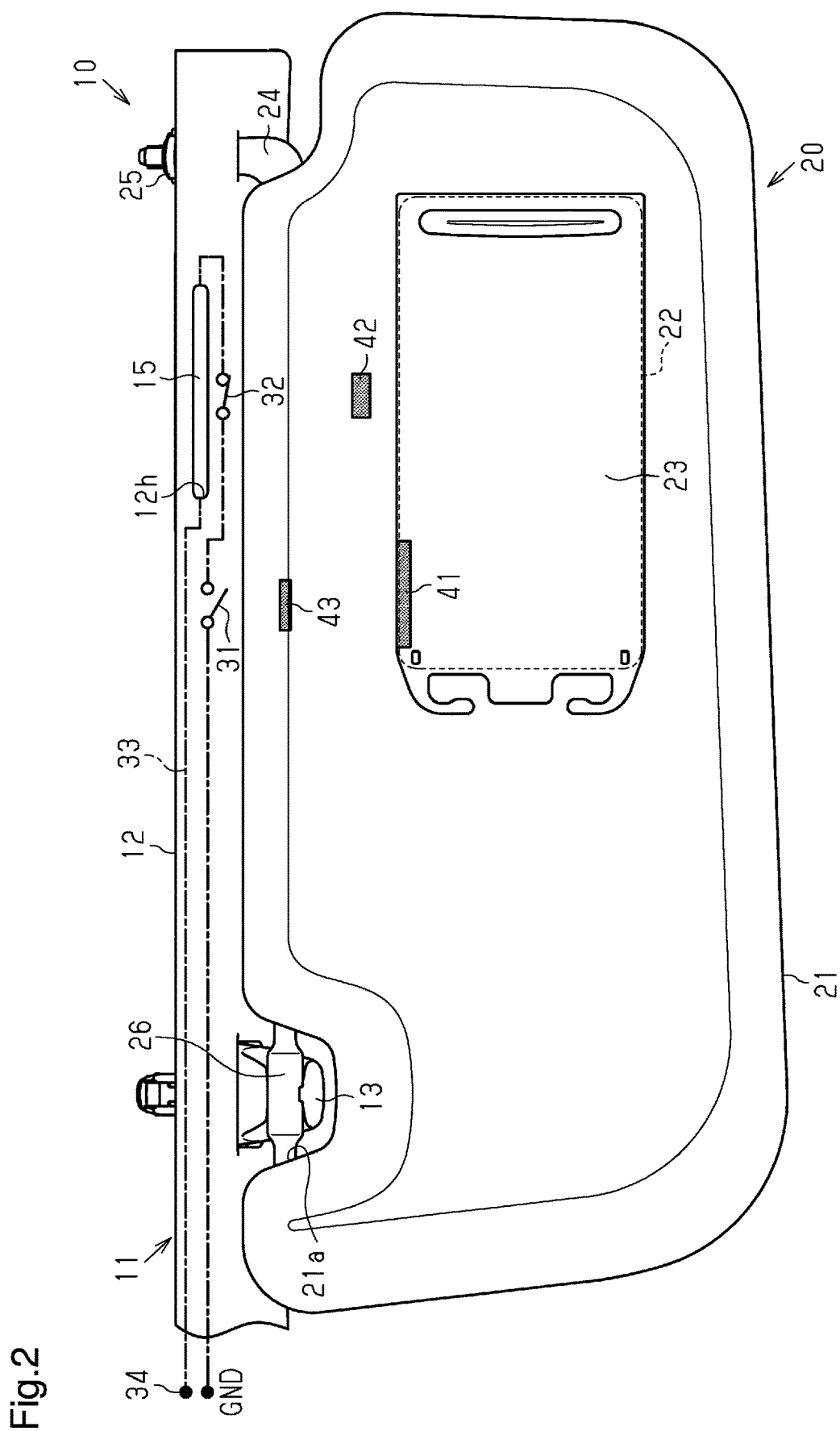
FIG. 2 is a schematic diagram showing a state in which a visor main body shown in FIG. 1 is in a use position, and a lid of the visor main body is in a closed position.

As shown in FIGS. 1 and 2, the vehicle sun visor module 10 includes a garnish portion 11, which is a ceiling component, and a vehicle sun visor 20. The vehicle sun visor 20 is used to prevent light from outside the vehicle from directly entering the eyes of an occupant in the passenger compartment. The vehicle sun visor module 10 is attached to a front portion of a ceiling of a vehicle by fixing the garnish portion 11 to the vehicle ceiling with fastening members such as bolts. The vehicle sun visor 20 is arranged to be adjacent to the garnish portion 11.

In the present description, directional terms such as front, rear, up, down, left, and right are defined with reference to the vehicle for illustrative purposes. However, definitions of these terms are not particularly limited.

Configuration of Garnish Portion 11

As shown in FIG. 2, the garnish portion 11 includes a garnish main body 12. The garnish main body 12 is made of a plastic. The garnish main body 12 is a plate that forms part of the ceiling. The garnish portion 11 thus forms part of a front portion of the vehicle ceiling. The garnish portion 11 includes a hook 13. The hook 13 projects downward from the garnish main body 12. The hook 13 is made of a plastic.

Lighting Device 15

As shown in FIGS. 2 and 3, the garnish portion 11 includes a lighting device 15. The lighting device 15 radiates light into the passenger compartment. The garnish main body 12 has an emission aperture 12h, through which light from the lighting device 15 is emitted. The lighting device 15 is attached to the garnish main body 12 such that light emitted by the lighting device 15 is radiated into the passenger compartment through the emission aperture 12h.

As shown in FIG. 3, the lighting device 15 is attached to the back surface of the garnish main body 12 with fastening members such as bolts. The back surface is a side opposite from the passenger compartment. The lighting device 15 is thus integrated with the garnish portion 11. The lighting device 15 is, for example, an LED light module. The LED light module includes an LED chip, which is a lighting body, and a control board, which controls operation of the LED chip.

Configuration of First Inductive Switch 31

As shown in FIGS. 2 and 4, the garnish portion 11 includes inductive switches that each turn on the lighting device 15 when set to the ON state, and turn off the lighting device 15 when set to the OFF state. The inductive switches include a first inductive switch 31. The first inductive switch 31 turns on the lighting device 15 when set to the ON state, and turns off the lighting device 15 when set to the OFF state. FIG. 2 schematically shows a switch circuit of the first inductive switch 31. FIG. 4 schematically shows a case that accommodates the switch circuit of the first inductive switch 31. The first inductive switch 31 is a normally-open reed switch that is set to the ON state when a magnetic field acts on the first inductive switch 31, and set to the OFF state when a magnetic field stops acting on the first inductive switch 31. The first inductive switch 31 is attached to the garnish main body 12. The first inductive switch 31 is thus integrated with the garnish portion 11.

Configuration of Second Inductive Switch 32

As shown in FIGS. 2 and 3, the inductive switches include a second inductive switch 32. The second inductive switch 32 turns on the lighting device 15 when set to the ON state, and turns off the lighting device 15 when set to the OFF state. FIG. 2 schematically shows a switch circuit of the second inductive switch 32. FIG. 3 schematically shows a case that accommodates the switch circuit of the second inductive switch 32. The second inductive switch 32 is a normally-closed reed switch that is set to the OFF state when a magnetic field acts on the second inductive switch 32, and set to the ON state when a magnetic field stops acting on the second inductive switch 32. The second inductive switch 32 is attached to the garnish main body 12. The second inductive switch 32 is thus integrated with the garnish portion 11.

Conductive Path

As shown in FIG. 2, the vehicle sun visor module 10 includes a wire 33. The wire 33 supplies power from a vehicle power source 34 to the lighting device 15. The lighting device 15 is thus electrically connected to the vehicle power source 34 via the wire 33. The wire 33 electrically connects the vehicle power source 34 to ground via the lighting device 15, the second inductive switch 32, and the first inductive switch 31. The wire 33 is, for example, engaged with and routed on the back surface of the garnish main body 12, the back surface being a side opposite from the passenger compartment.

When the first inductive switch 31 and the second inductive switch 32 are both set to the ON state, a conductive path is established from the power source 34 to the ground. Accordingly, power is supplied from the power source 34 to the lighting device 15 so that the lighting device 15 is turned on. When at least one of the first inductive switch 31 and the second inductive switch 32 is set to the OFF state, the conductive path from the power source 34 to the ground is interrupted. Accordingly, power stops being supplied from the power source 34 to the lighting device 15 so that the lighting device 15 is turned off.

Configuration of Vehicle Sun Visor 20

The vehicle sun visor 20 includes a visor main body 21, a mirror 22, and a lid 23. FIG. 2 and the subsequent drawings schematically show the relationship between the visor main body 21, the mirror 22, and the lid 23. The visor main body 21 is made of a plastic. The visor main body 21 is formed by stacking and joining two shell-shaped half bodies together. The visor main body 21 has a shape of a flat plate. The visor main body 21 has a shape of an elongated rectangle in plan view. The visor main body 21 is arranged in relation to the garnish portion 11 such that a longitudinal direction of the visor main body 21 agrees with a vehicle width direction.

The vehicle sun visor 20 includes an arm 24. The arm 24 is a column that is bent into an L-shape. One end of the arm 24 is supported by the garnish portion 11 with a bracket 25. The other end of the arm 24 is inserted into a bearing portion (not shown) of the visor main body 21.

As shown in FIG. 3, the visor main body 21 is pivotal about the arm 24 with respect to the garnish portion 11. In other words, the visor main body 21 pivots about a straight line extending in the vehicle width direction. The visor main body 21 is pivotal between a use position and a retracted position with respect to the garnish portion 11. In FIGS. 1 and 3, the solid lines depict the visor main body 21 in the use position, and the long-dash double-short-dash lines depict the visor main body 21 in the retracted position. When the visor main body 21 is in the use position, the visor main body 21 prevents light from outside the vehicle from directly entering the eyes of an occupant in the passenger compartment.

As shown in FIGS. 1 and 2, the visor main body 21 has a cutout 21a in a periphery. The vehicle sun visor 20 also includes a columnar engagement portion 26. The engagement portion 26 is provided in the visor main body 21 so as to extend across the cutout 21a in the longitudinal direction of the visor main body 21. The engagement portion 26 can be engaged with the hook 13. With the engagement portion 26 engaged with the hook 13, the visor main body 21 is pivotal about the arm 24 with respect to the garnish portion 11. In other words, the visor main body 21 pivots about a straight line extending in the vehicle width direction.

Figure 5:
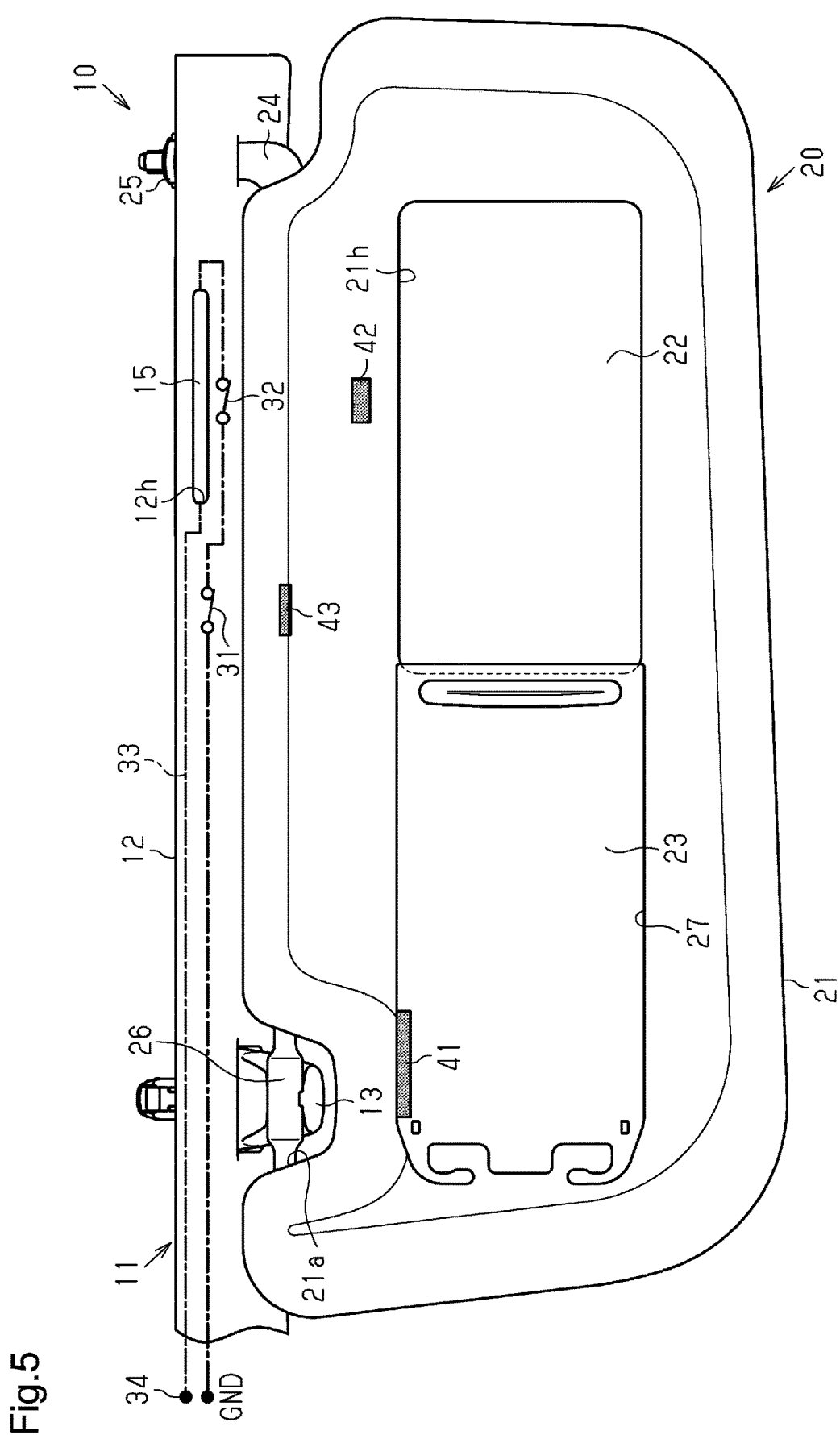
FIG. 5 is a schematic diagram showing a state in which the visor main body shown in FIG. 1 is in the use position, and the lid of the visor main body is in an open position.

As shown in FIG. 5, the visor main body 21 has a rectangular opening 21h. The opening 21h is substantially rectangular in plan view. The visor main body 21 includes a slide mechanism 27, which is continuous with the opening 21h. The slide mechanism 27 includes, for example, rails that extend from the opening 21h in the longitudinal direction of the visor main body 21. The slide mechanism 27 is provided inside the visor main body 21.

The mirror 22 is attached to the visor main body 21. The mirror 22 has a shape of a flat plate. The mirror 22 is attached to the visor main body 21 with the thickness direction of the mirror 22 agreeing with the thickness direction of the visor main body 21. The mirror 22 is attached to the visor main body 21 by being fitted into the opening 21h.

As shown in FIGS. 2 and 5, the lid 23 has a shape of a substantially elongated rectangular plate. The lid 23 is made of a plastic. The slide mechanism 27 allows the lid 23 to slide with respect to the visor main body 21. The lid 23 is movable along the slide mechanism 27 so as to be selectively shown and retracted into the visor main body 21. The lid 23 moves from inside the visor main body 21 to a position overlapping with the opening 21h, thereby covering the mirror 22. Also, the lid 23 is retracted into the visor main body 21 from the opening 21h, thereby exposing the mirror 22. In this manner, the lid 23 is movable relative to the visor main body 21 between an open position, in which the lid exposes the mirror 22, and a closed position, in which the lid 23 covers the mirror 22. The slide mechanism 27 is configured to hold the lid 23 in the open position and the closed position.

First Magnet 41

The vehicle sun visor 20 includes magnets capable of switching the inductive switches between the ON state and the OFF state. The magnets include the first magnet 41. FIG. 2 and the subsequent drawings schematically show the first magnet 41 with stippling. The first magnet 41 is provided on the lid 23. The first magnet 41 is provided in an upper periphery of the lid 23 in a state in which the visor main body 21 is in the use position. The first magnet 41 produces a magnetic field. The first magnet 41 is capable of cooperating with a third magnet 43, which will be discussed below, to switch the first inductive switch 31 between the ON state and the OFF state. Specifically, when the lid 23 is in the open position, the first magnet 41 sets the first inductive switch 31 to the ON state. When the lid 23 is in the closed position, the first magnet 41 sets the first inductive switch 31 to the OFF state.

Second Magnet 42

As shown in FIGS. 2 and 3, the magnets include a second magnet 42. FIG. 2 and the subsequent drawings schematically show the second magnet 42 with stippling. The second magnet 42 is incorporated in the visor main body 21. The second magnet 42 is located between the opening 21h and the garnish portion 11 when the visor main body 21 is in the use position. The second magnet 42 is provided in a position in the visor main body 21 that corresponds to the second inductive switch 32. That is, the second magnet 42 is provided in a position where, when the visor main body 21 is in the retracted position, the second magnet 42 faces the second inductive switch 32 in the vertical direction. The second magnet 42 produces a magnetic field. The second magnet 42 is capable of switching the second inductive switch 32 between the ON state and the OFF state. Specifically, when the visor main body 21 is in the use position, the second magnet 42 sets the second inductive switch 32 to the ON state. When the visor main body 21 is in the retracted position, the second magnet 42 sets the second inductive switch 32 to the OFF state.

Relationship of Lighting Device 15 with First Magnet 41 and Second Magnet 42

The lighting device 15 is turned on when both the first inductive switch 31 and the second inductive switch 32 are set to the ON state. The lighting device 15 is turned off when at least one of the first inductive switch 31 and the second inductive switch 32 is set to the OFF state.

Third Magnet 43

As shown in FIGS. 2 and 5, the magnets include the third magnet 43. FIG. 2 and the subsequent drawings schematically show the third magnet 43 with stippling. The third magnet 43 is incorporated in the visor main body 21. The third magnet 43 is provided in an upper periphery of the visor main body 21 in a state in which the visor main body 21 is in the use position. The third magnet 43 produces a magnetic field that sets the first inductive switch 31 to the ON state. The direction of the magnetic field produced by the third magnet 43 is opposite to the direction of the magnetic field produced by the first magnet 41.

Relationship Between First Magnet 41 and Third Magnet 43

The first magnet 41 is provided in the visor main body 21 such that, when the lid 23 is in the closed position, the first magnet 41 is closest to the third magnet 43. When the lid 23 is in the open position, the first magnet 41 is away from the magnetic field produced by the third magnet 43 and stops cancelling the magnetic field produced by the third magnet 43. Accordingly, the first inductive switch 31 is set to the ON state by the magnetic field produced by the third magnet 43. In other words, when the lid 23 is in the open position, the first magnet 41 is away from the magnetic field produced by the third magnet 43 so as to set the first inductive switch 31 to the ON state. When the lid 23 is in the closed position, the first magnet 41 cancels the magnetic field produced by the third magnet 43. This sets the first inductive switch 31 to the OFF state. In other words, when the lid 23 is in the closed position, the first magnet 41 cancels the magnetic field produced by the third magnet 43 so as to set the first inductive switch 31 to the OFF state.

Operation

Operation of the present embodiment will now be described.

It is assumed in an example that the visor main body 21 is in the retracted position, and the lid 23 is in the closed position. In this state, the first magnet 41 cancels the magnetic field produced by the third magnet 43 so that the first inductive switch 31 is set to the OFF state, and the second inductive switch 32 is set to the OFF state by the magnetic field that is produced by the second magnet 42 and acts on the second inductive switch 32. Accordingly, the lighting device 15 is turned off.

In this state, if the visor main body 21 moves to the use position, the second magnet 42 moves away from the second inductive switch 32, so that the magnetic field produced by the second magnet 42 stops acting on the second inductive switch 32. This sets the second inductive switch 32 to the ON state.

If the lid 23 is in the open position, the first magnet 41 is away from the magnetic field produced by the third magnet 43, so that the magnetic field produced by the third magnet 43 acts on the first inductive switch 31. This sets the first inductive switch 31 to the ON state. As a result, the first inductive switch 31 and the second inductive switch 32 are both set to the ON state, so that the lighting device 15 is turned on.

It is assumed in another example that the visor main body 21 is in the use position, and the lid 23 is in the open position. In this state, if the lid 23 moves to the closed position, the first magnet 41 approaches the third magnet 43, so that the magnetic field produced by the first magnet 41 cancels the magnetic field produced by the third magnet 43. The magnetic field produced by the third magnet 43 thus stops acting on the first inductive switch 31, so that the first inductive switch 31 is set to the OFF state. This turns off the lighting device 15.

It is now assumed that the visor main body 21 is in the use position, and the lid 23 is in the open position. In this state, for example, the visor main body 21 is moved to the retracted position with the lid 23 maintained in the open position. Accordingly, the second magnet 42 approaches the second inductive switch 32, so that the magnetic field produced by the second magnet 42 acts on the second inductive switch 32. The second inductive switch 32 is set to the OFF state. This turns off the lighting device 15.

Advantages

The above-described embodiment has the following advantages.

(1) The garnish portion 11 includes the lighting device 15, the first inductive switch 31, and the second inductive switch 32. Thus, unlike the case in the related art, it is not necessary to route a wire, for example, from the ceiling of the vehicle into the visor main body 21 of vehicle sun visor 20 to electrically connect the wire to the lighting device 15. This allows the conductive path from the vehicle power source 34 to the lighting device 15 to be shortened, so that power is supplied to the lighting device 15 in a stable manner.

The vehicle sun visor 20 further includes the first magnet 41 and the third magnet 43, which are capable of switching the first inductive switch 31 between the ON state and the OFF state, and the second magnet 42, which is capable of switching the second inductive switch 32 between the ON state and the OFF state. Thus, simply providing the vehicle sun visor 20 with the first magnet 41, the second magnet 42, and the third magnet 43 allows the first inductive switch 31 to be switched between the ON state and the OFF state, and allows the second inductive switch 32 to be switched between the ON state and the OFF state. Accordingly, the lighting device 15 can be easily turned on and off with a simplified structure of the vehicle sun visor 20. In this manner, it is possible to supply power to the lighting device 15 in a stable manner and allow the lighting device 15 to be easily turned on and off with a simplified structure of the vehicle sun visor 20.

(2) When the lid 23 is in the open position, the first magnet 41 sets the first inductive switch 31 to the ON state, so that the lighting device 15 is turned on. Also, when the lid 23 is in the closed position, the first magnet 41 sets the first inductive switch 31 to the OFF state, so that the lighting device 15 is turned off. In this manner, the lighting device 15 can be easily turned on and off by changing the position of the lid 23 with respect to the visor main body 21.

(3) The lighting device 15 is turned on when the first inductive switch 31 and the second inductive switch 32 are both set to the ON state. That is, the lighting device 15 is turned on only when the visor main body 21 is in the use position, and the lid 23 is in the open position. This allows the lighting device 15 to be turned on when an occupant uses the mirror 22 as a vanity mirror.

The lighting device 15 is turned off when at least one of the first inductive switch 31 and the second inductive switch 32 is set to the OFF state. Thus, for example, even if the lid 23 is not in the closed position, the lighting device 15 is turned off if the visor main body 21 is in the retracted position. This prevents the lighting device 15 from being left on unintentionally, and thus saves energy.

(4) The first magnet 41 is provided on the lid 23. This allows the first magnet 41 to move integrally with the lid 23, so that the first inductive switch 31 is switched between the ON state and the OFF state in conjunction with movement of the lid 23 with respect to the visor main body 21.

(5) The magnets further include the third magnet 43, which produces a magnetic field that sets the first inductive switch 31 to the ON state. When the lid 23 is in the open position, the first magnet 41 is away from the magnetic field produced by the third magnet 43 so as to set the first inductive switch 31 to the ON state. When the lid 23 is in the closed position, the first magnet 41 cancels the magnetic field produced by the third magnet 43 so as to set the first inductive switch 31 to the OFF state.

With this configuration, even if the first inductive switch 31 is arranged in a position outside the range of the magnetic field produced by the first magnet 41, the first inductive switch 31 can be switched between the ON state and the OFF state by providing the visor main body 21 with the third magnet 43. This increases the flexibility in design of the position of the first inductive switch 31 in relation to the garnish portion 11, and the position of the first magnet 41 in relation to the vehicle sun visor 20.

(6) The first inductive switch 31 and the second inductive switch 32 are switched between the ON state and the OFF state depending on whether a magnetic field is acting thereon. Thus, operating noise is unlikely to be produced, unlike a case of a mechanical switch. This improves the quietness.

(7) The first inductive switch 31 and the second inductive switch 32 are switched between the ON state and the OFF state depending on whether a magnetic field is acting thereon. It is thus possible to minimize the number of contacts of switches. This simplifies the configuration.

Modifications

The above-described embodiment may be modified as follows. The above-described embodiment and the following modifications can be combined as long as the combined modifications remain technically consistent with each other.

Figure 6:
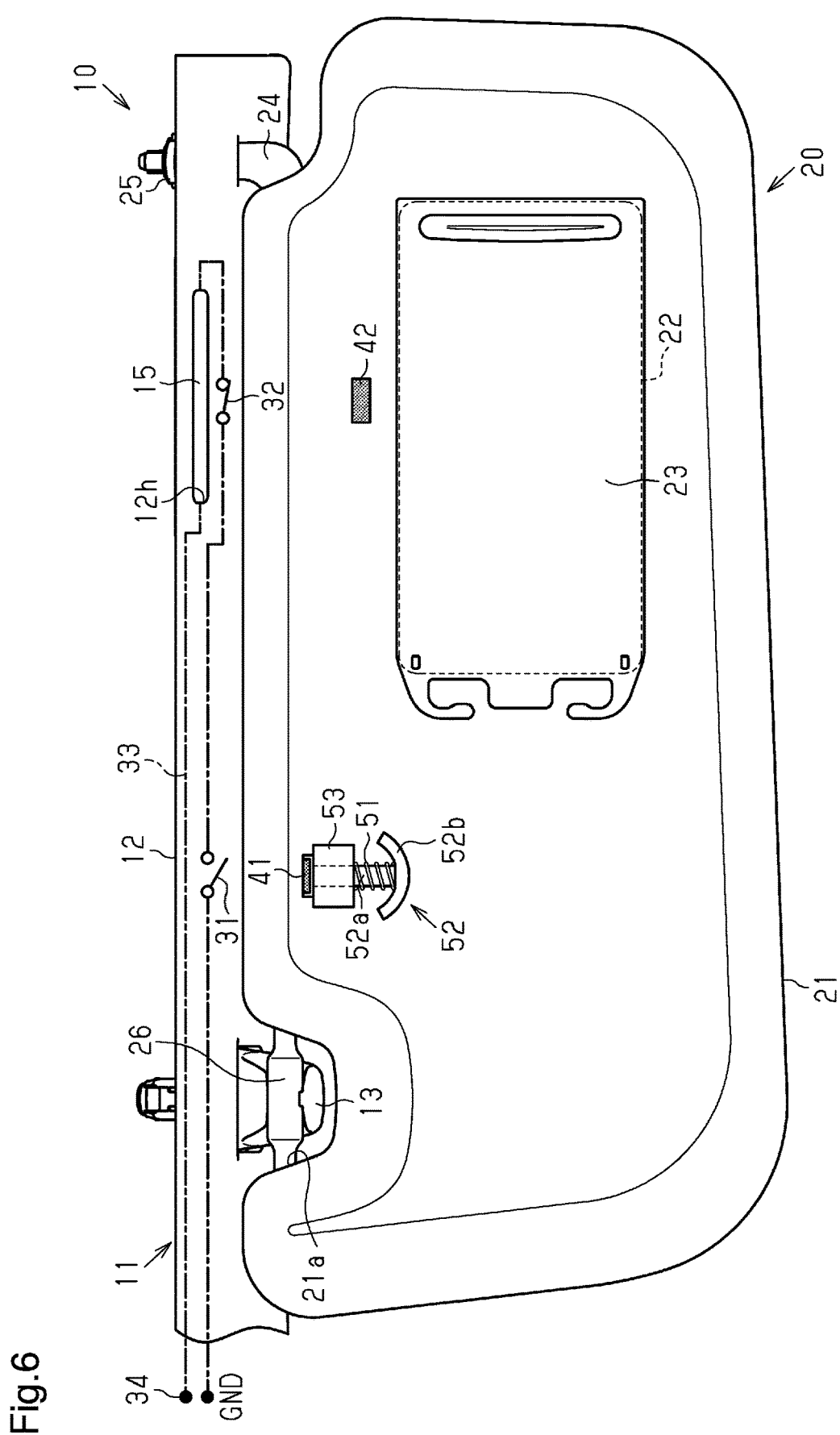
FIG. 6 is a schematic diagram showing a state in which a visor main body of a vehicle sun visor module according to another embodiment is in a use position, and a lid of the visor main body is in a closed position.
Figure 7:
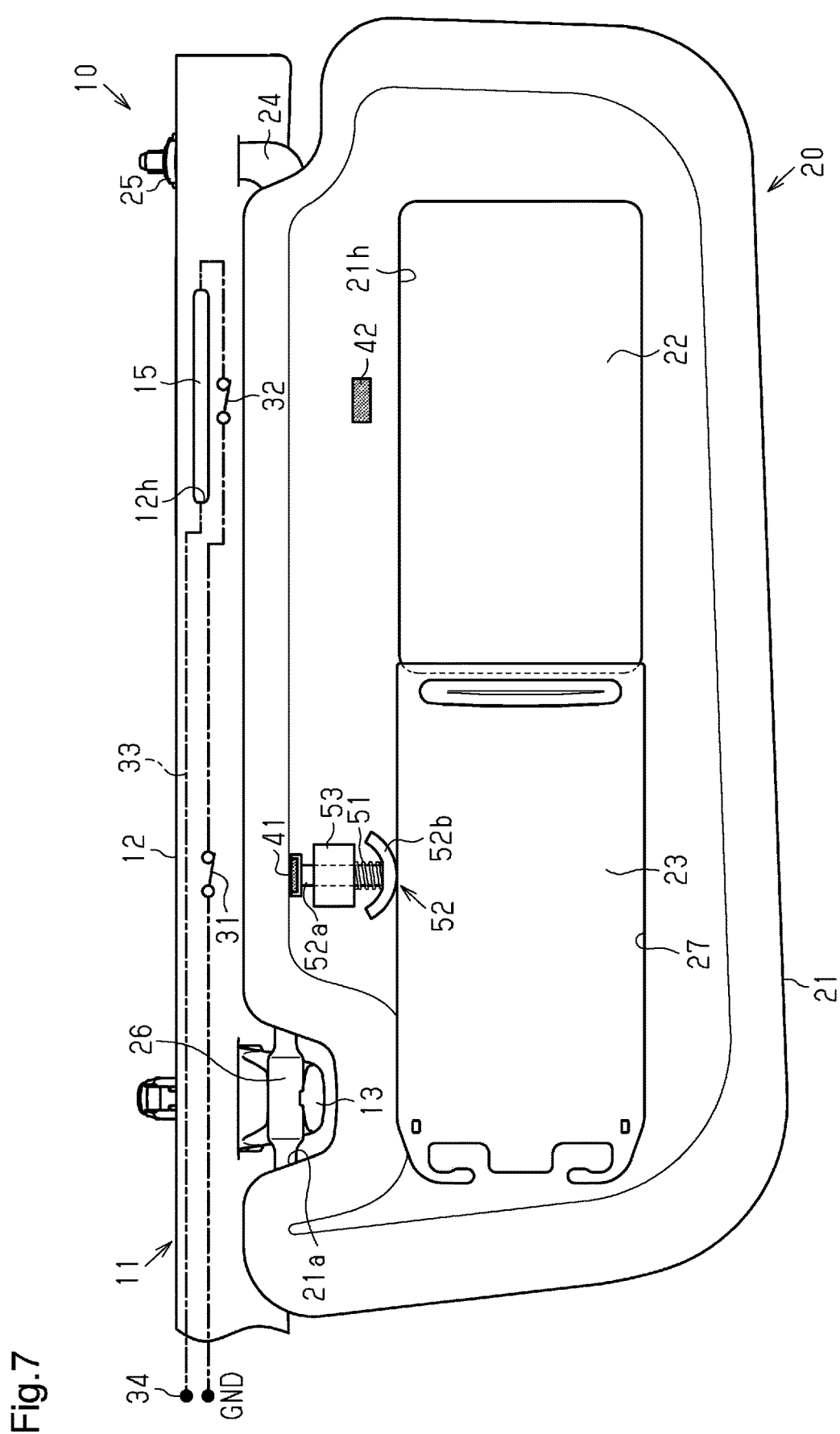
FIG. 7 is a schematic diagram showing a state in which the visor main body shown in FIG. 6 is in the use position, and the lid of the visor main body is in an open position.

As shown in FIGS. 6 and 7, the first magnet 41 may be provided in a position in the visor main body 21 that corresponds to the first inductive switch 31. That is, the first magnet 41 may be provided in a position where, when the visor main body 21 is in the retracted position, the first magnet 41 faces the first inductive switch 31 in the vertical direction of the vehicle. The visor main body 21 includes an urging portion 51. The urging portion 51 is a compression spring that urges the first magnet 41 away from the first inductive switch 31. The urging portion 51 is incorporated in the visor main body 21. The visor main body 21 includes a supporting member 52, which supports the first magnet 41. The supporting member 52 includes a pillar-shaped supporting portion 52*a* and a plate-shaped flange 52*b*. The supporting portion 52*a* includes a first end and a second end, which is on the side opposite to the first end. The flange 52*b* protrudes from the first end of the supporting portion 52*a*. The supporting member 52 is provided on the visor main body 21 such that an axial direction of the supporting portion 52*a* is orthogonal to the longitudinal direction of the visor main body 21 and orthogonal to the thickness direction of the visor main body 21. The first magnet 41 is attached to the second end of the supporting portion 52*a*. The visor main body 21 further includes a spring supporting portion 53, which supports the urging portion 51. The spring supporting portion 53 is tubular. The spring supporting portion 53 is incorporated in the visor main body 21. The second end of the supporting portion 52*a* extends through the interior of the spring supporting portion 53. The urging portion 51 is placed between the spring supporting portion 53 and the flange 52*b*. The urging portion 51 urges the flange 52*b* away from the spring supporting portion 53. As a result, the urging portion 51 urges the first magnet 41 away from the first inductive switch 31. When moved to the open position, the lid 23 contacts the flange 52*b*.

When the lid 23 moves to the open position as shown in FIG. 7, the lid 23 contacts the flange 52*b*, so that the lid 23 pushes the supporting member 52 toward the first inductive switch 31 against the urging force of the urging portion 51. Accordingly, the first magnet 41 approaches the first inductive switch 31, so that the first inductive switch 31 is set to the ON state. In this manner, as the lid 23 moves to the open position, the lid 23 pushes the first magnet 41 against the urging force of the urging portion 51. Then, the first magnet 41 approaches the first inductive switch 31, so as to set the first inductive switch 31 to the ON state.

When the lid 23 is in the closed position as shown in FIG. 6, the urging force of the urging portion 51 returns the supporting member 52 to the original position (i.e. the position before being pushed by the lid 23). In this manner, the first magnet 41 moves to the original position (i.e. the position before being pushed by the lid 23). That is, the first magnet 41 separates from the first inductive switch 31, so as to set the first inductive switch 31 to the OFF state. The lighting device 15 may be turned on and off in the above-described manner.

This configuration allows the first inductive switch 31 to be set to the ON state and the OFF state using the first magnet 41, without providing the lid 23 with the first magnet 41. This simplifies the configuration of the lid 23.

Figure 8:
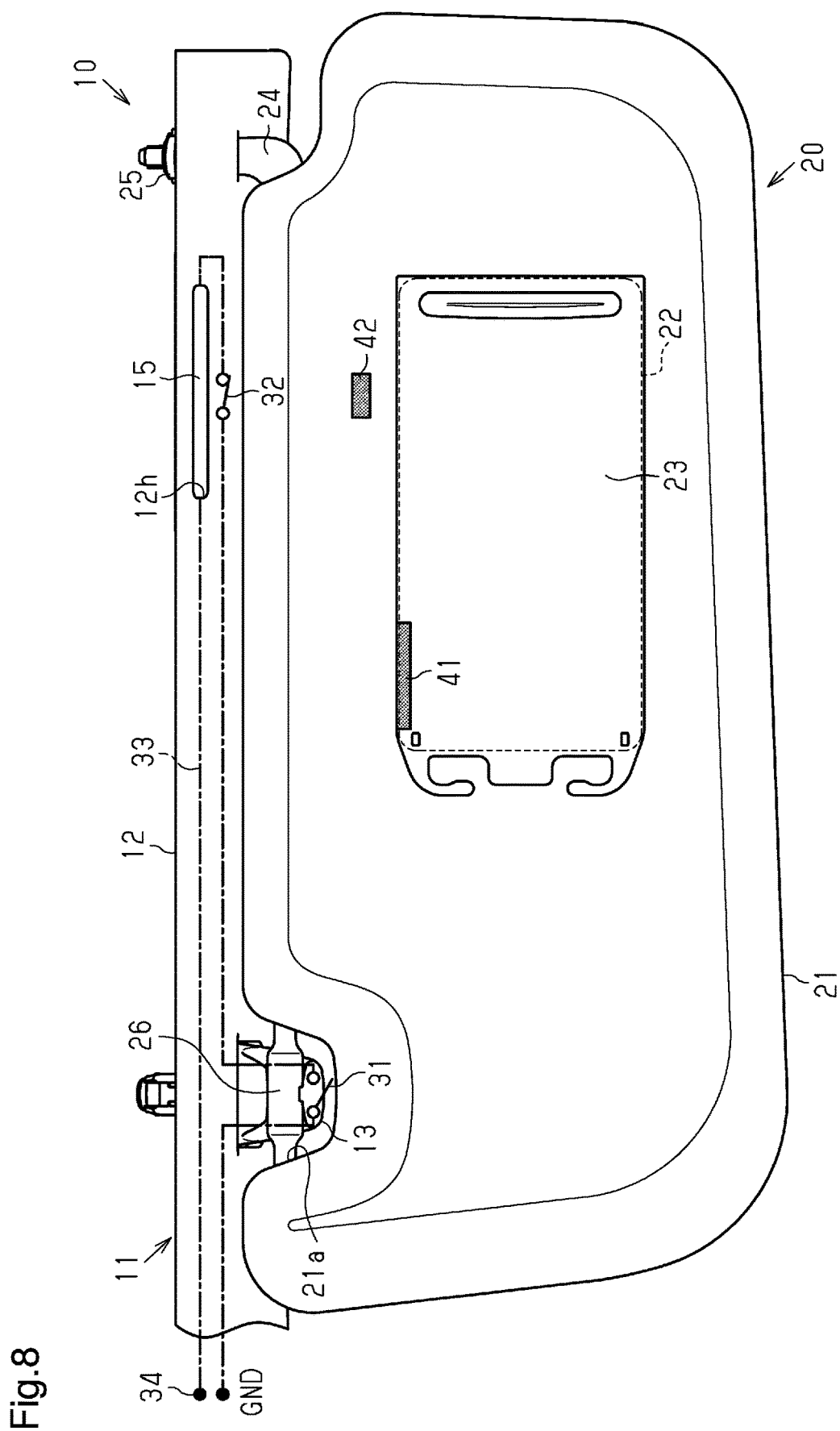
FIG. 8 is a schematic diagram showing a state in which a visor main body of a vehicle sun visor module according to a further embodiment is in a use position, and a lid of the visor main body is in a closed position.
Figure 9:
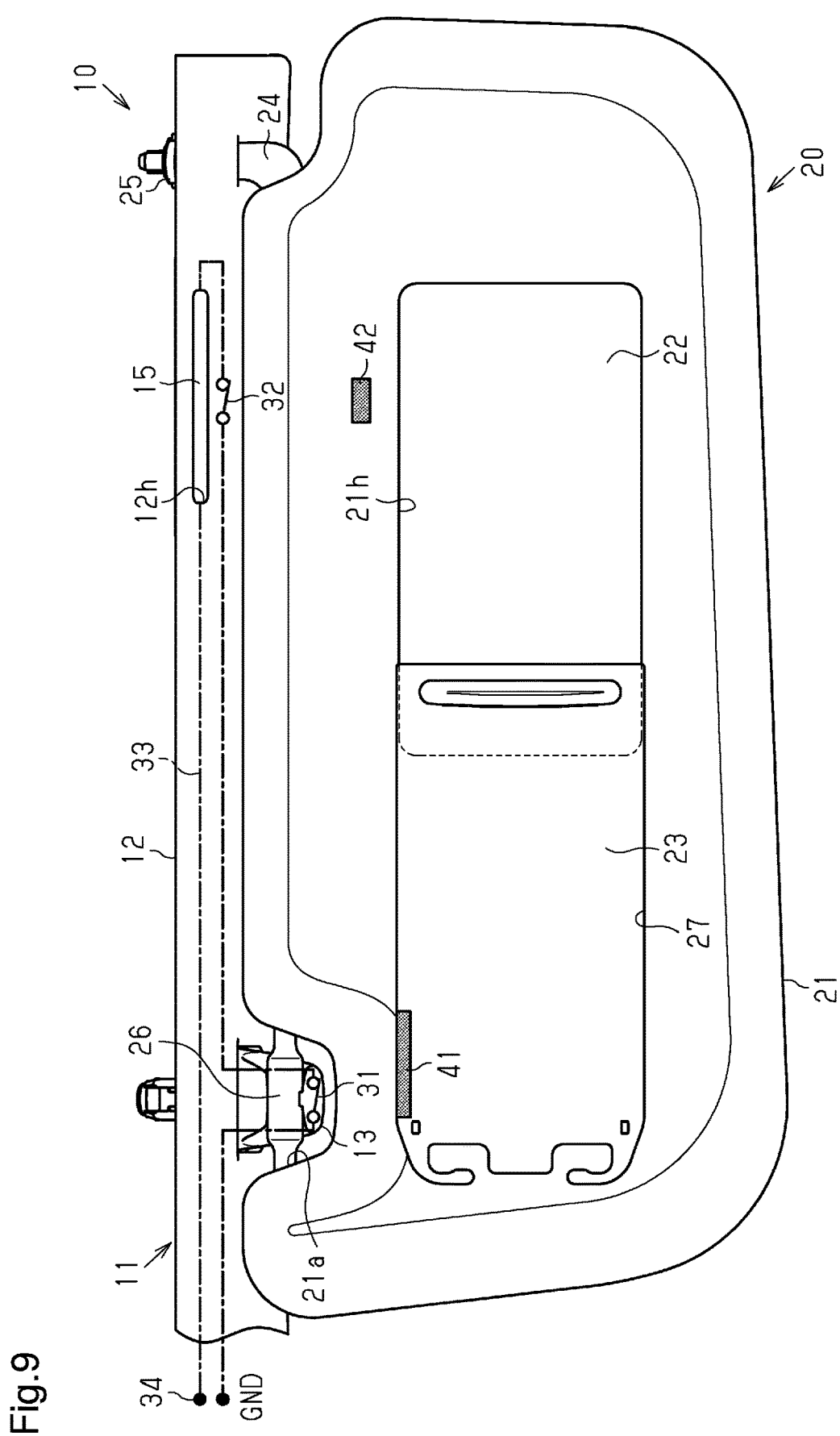
FIG. 9 is a schematic diagram showing a state in which the visor main body shown in FIG. 8 is in the use position, and the lid of the visor main body is in an open position.

As shown in FIGS. 8 and 9, the first inductive switch 31 may be incorporated, for example, in the hook 13. In this case, the hook 13 is hollow and accommodates the first inductive switch 31. When the lid 23 is in the open position as shown in FIG. 9, the magnetic field of the first magnet 41 acts on the first inductive switch 31, so that the first inductive switch 31 is set to the ON state. When the lid 23 is in the closed position as shown in FIG. 8, the magnetic field of the first magnet 41 stops acting on the first inductive switch 31, so that the first inductive switch 31 is set to the OFF state. The lighting device 15 may be turned on and off in the above-described manner.

Figure 10:
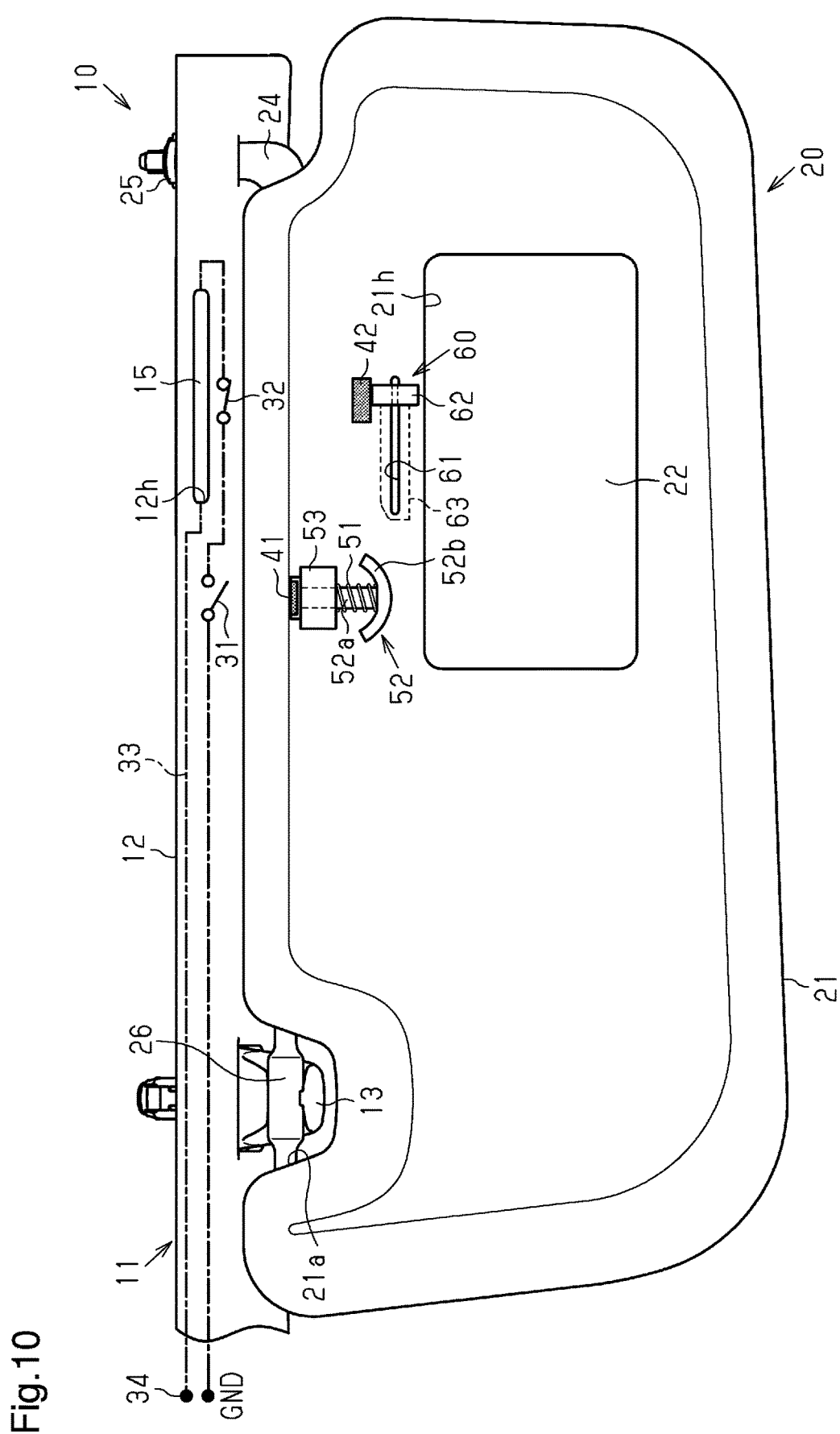
FIG. 10 is a schematic diagram showing a state in which a manipulation portion of a mechanical switch of a vehicle sun visor module according to yet another embodiment is in a first position.
Figure 11:
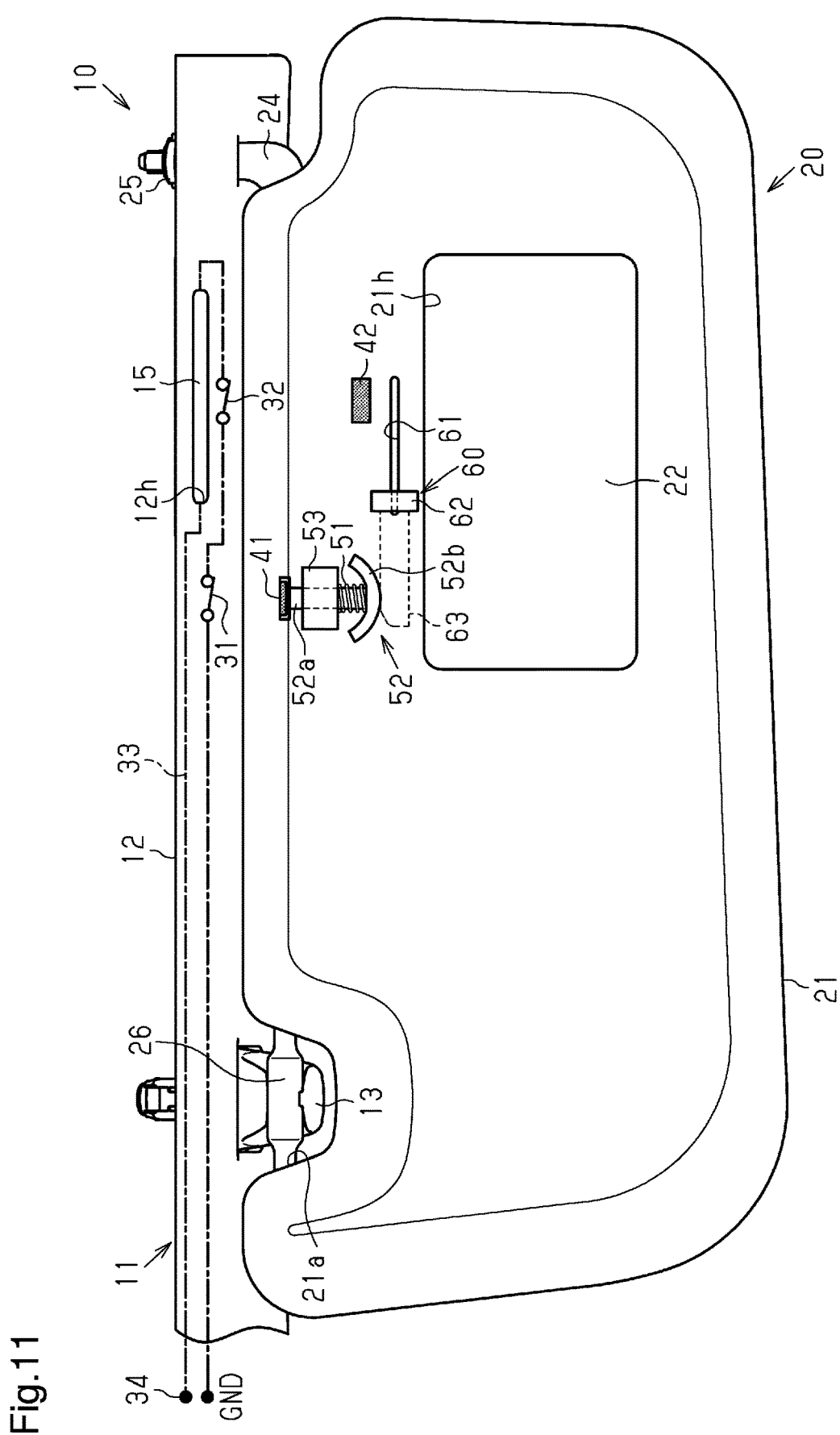
FIG. 11 is a schematic diagram showing a state in which the manipulation portion of the mechanical switch shown in FIG. 10 is in a second position.

As shown in FIGS. 10 and 11, the vehicle sun visor 20 does not necessarily need to include the lid 23. The vehicle sun visor 20 may include a mechanical switch 60 that moves the first magnet 41 toward and away from the first inductive switch 31. The vehicle sun visor 20 includes, for example, the urging portion 51, the supporting member 52, and the spring supporting portion 53, which have been described in the embodiment shown in FIGS. 6 and 7.

The visor main body 21 has a guiding groove 61, which guides the mechanical switch 60. The mechanical switch 60 includes a manipulation portion 62, which is movable along the guiding groove 61, and a contact portion 63, which moves integrally with the manipulation portion 62 and contacts the flange 52*b* of the supporting member 52. The manipulation portion 62 is moved along the guiding groove 61 so as to be switchable between a first position, where the first inductive switch 31 is set to the OFF state, and a second position, where the first inductive switch 31 is set to the ON state.

When the manipulation portion 62 of the mechanical switch 60 is moved from the first position to the second position as shown in FIG. 11, the contact portion 63 pushes the first magnet 41 against the urging force of the urging portion 51. Specifically, when the manipulation portion 62 moves from the first position to the second position, the contact portion 63 contacts the flange 52*b*, and the contact portion 63 pushes the supporting member 52 toward the first inductive switch 31 against the urging force of the urging portion 51. Accordingly, the first magnet 41 approaches the first inductive switch 31, so that the first inductive switch 31 is set to the ON state.

When the manipulation portion 62 of the mechanical switch 60 is in the first position as shown in FIG. 10, the urging force of the urging portion 51 returns the supporting member 52 to the original position (i.e. the position before being pushed by the contact portion 63). In this manner, the first magnet 41 moves to the original position (i.e. the position before being pushed by the contact portion 63). That is, the first magnet 41 separates from the first inductive switch 31, so as to set the first inductive switch 31 to the OFF state. Thus, the first magnet 41 is capable of switching the first inductive switch 31 between the ON state and the OFF state through manipulation of the mechanical switch 60. The lighting device 15 may be turned on and off in the above-described manner.

This modification is suitable for a configuration in which the vehicle sun visor 20 does not include the lid 23, which is movable relative to the visor main body 21 between the open position, in which the lid 23 exposes the mirror 22, and the closed position, in which the lid 23 covers the mirror 22.

Figure 12:
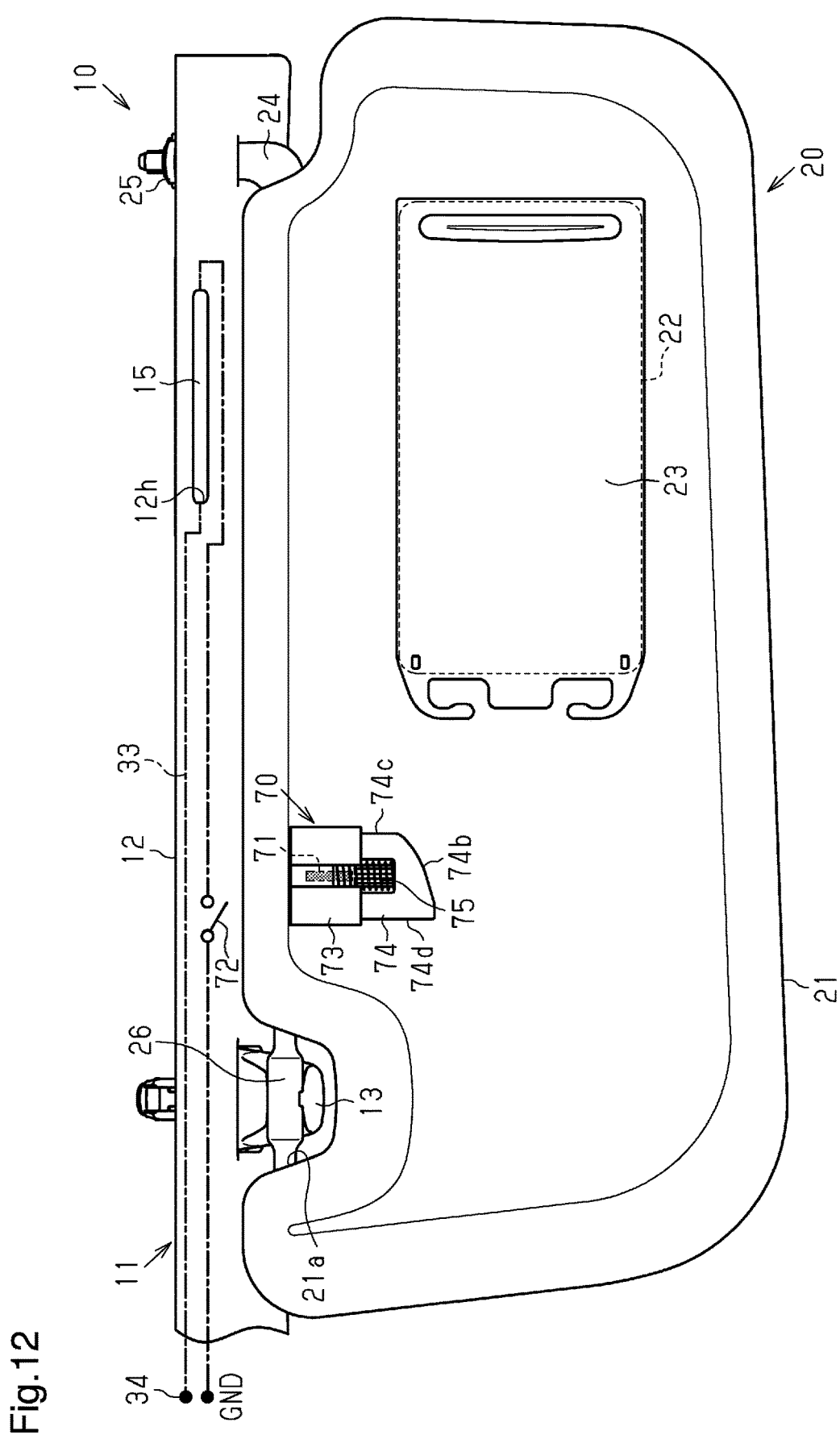
FIG. 12 is a schematic diagram showing a state in which a visor main body of a vehicle sun visor module according to another embodiment is in a use position, and a lid of the visor main body is in a closed position.
Figure 13:
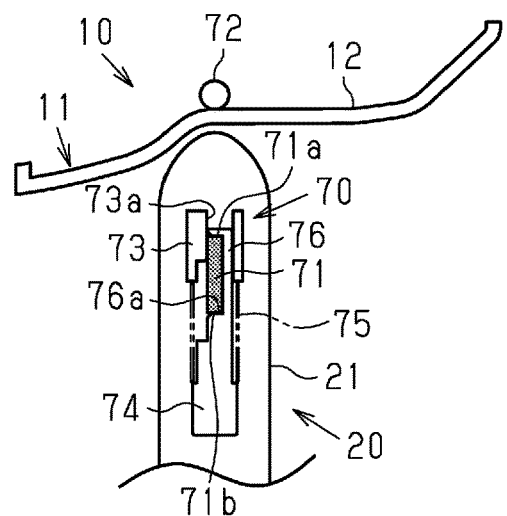
FIG. 13 is a schematic diagram showing a state in which the visor main body shown in FIG. 12 is in the use position.

As shown FIGS. 12 and 13, the vehicle sun visor module 10 may include a single magnet 71 and a single inductive switch 72. The garnish portion 11 is provided with the single inductive switch 72. The vehicle sun visor 20 is provided with the single magnet 71. The magnet 71 has a shape of, for example, a quadrangular prism. The magnet 71 is magnetized in an axial direction of the magnet 71. A first end 71a in the axial direction of the magnet 71 is magnetized, for example, as a north pole. A second end 71b of the magnet 71, which is on a side opposite to the first end 71a, is magnetized, for example, as a south pole. The magnet 71 may be configured such that the first end 71a is magnetized as a south pole, and the second end is magnetized as a north pole.

The vehicle sun visor module 10 includes a magnetic switch 70. The magnetic switch 70 holds the magnet 71. The magnetic switch 70 is incorporated in the visor main body 21. The visor main body 21 thus includes the magnetic switch 70. The magnetic switch 70 is provided in a position in the visor main body 21 that corresponds to the inductive switch 72. The magnet 71 is thus provided in a position in the visor main body 21 that corresponds to the inductive switch 72. That is, the magnet 71 is provided in a position where, when the visor main body 21 is in the retracted position, the magnet 71 faces the inductive switch 72 in the vertical direction.

Figure 14:
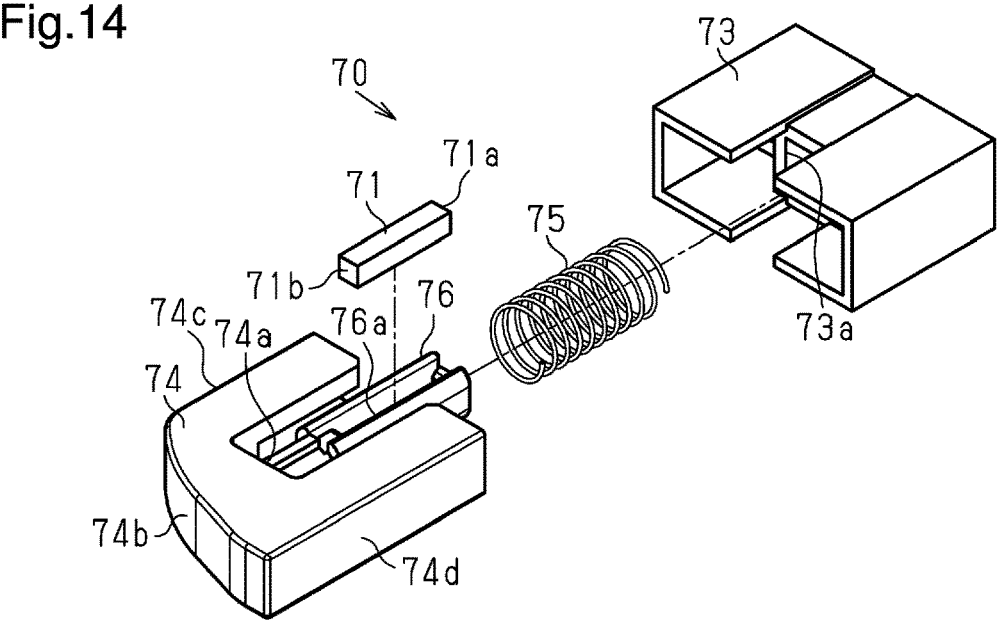
FIG. 14 is an exploded perspective view of a magnetic switch shown in FIG. 12.
Figure 15:
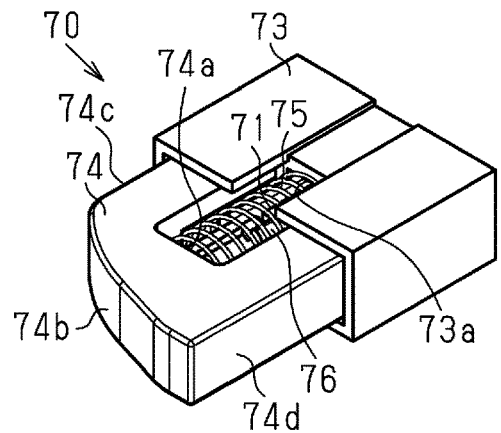
FIG. 15 is a perspective view of the magnetic switch in FIG. 12.

As shown in FIGS. 14 and 15, the magnetic switch 70 includes a casing 73, a movable body 74, and an urging portion 75. The visor main body 21 thus includes the urging portion 75. The casing 73 has a shape of a rectangular tube. The casing 73 is made of a plastic. The casing 73 has an insertion hole 73a. The insertion hole 73a has a rectangular shape.

The movable body 74 has a shape of a rectangular plate. The movable body 74 is made of a plastic. The movable body 74 includes a holder portion 76. The holder portion 76 has a shape of a quadrangular prism. The holder portion 76 can be inserted into the insertion hole 73a of the casing 73. The outer surface of the holder portion 76 and the inner surface of the insertion hole 73a contact each other, so as to restrict the movable body 74 from rotating relative to the casing 73 about the axis of the insertion hole 73a.

The holder portion 76 has an accommodating recess 76a, which has a shape of an elongated rectangular hole. The longitudinal direction of the accommodating recess 76a agrees with the axial direction of the holder portion 76. The accommodating recess 76a accommodates the magnet 71. The magnet 71 is held by the holder portion 76 while being accommodated in the accommodating recess 76a. The magnet 71 is accommodated in the accommodating recess 76a in a state in which the axial direction of the magnet 71 agrees with the longitudinal direction of the accommodating recess 76a.

The movable body 74 has a base surface 74a, from which the holder portion 76 protrudes. The base surface 74a is, for example, a flat surface. The base surface 74a extends in a direction orthogonal to the axial direction of the holder portion 76. The shape of the base surface 74a is not limited to a flat surface, but may be changed. The movable body 74 also includes a curved surface 74b. The curved surface 74b is located on a side of the movable body 74 that is opposite to the base surface 74a. The curved surface 74b is inclined while being gradually curved from a first side surface 74c toward a second side surface 74d of the movable body 74. The curved surface 74b extends from the first side surface 74c to the second side surface 74d such that the distance from the base surface 74a gradually increases as the distance from the first side surface 74c increases. The curved surface 74b has a convex shape with respect to the base surface 74a.

The urging portion 75 is a compression spring. The urging portion 75 is located between the casing 73 and the movable body 74. The urging portion 75 urges the movable body 74 away from the casing 73.

Figure 16:
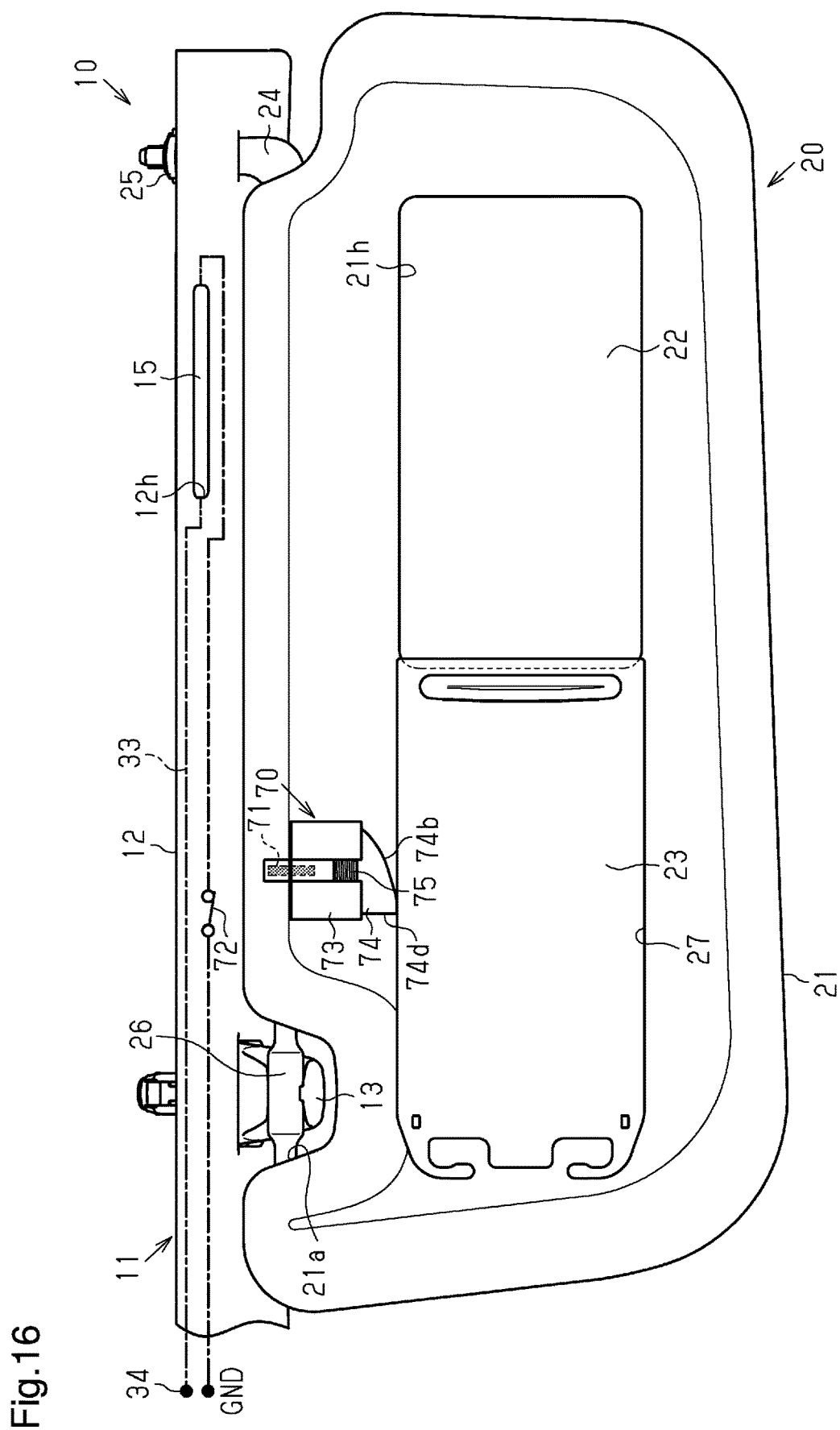
FIG. 16 is a schematic diagram showing a state in which the visor main body shown in FIG. 12 is in the use position, and the lid of the visor main body is in an open position.

When the visor main body 21 is in the use position as shown in FIGS. 12 and 16, the curved surface 74b of the movable body 74 is farther from the inductive switch 72 than the casing 73. The urging portion 75 urges the movable body 74 away from the inductive switch 72. As a result, the urging portion 75 urges the magnet 71 away from the inductive switch 72. Also, the first side surface 74c of the movable body 74 is closer to the mirror 22 than the second side surface 74d of the movable body 74. The moving direction of the movable body 74 is orthogonal to the direction in which the lid 23 slides along the slide mechanism 27. When the visor main body 21 is in the use position as shown in FIGS. 12 and 13, the moving direction of the movable body 74 is a direction toward or away from the inductive switch 72.

Figure 17:
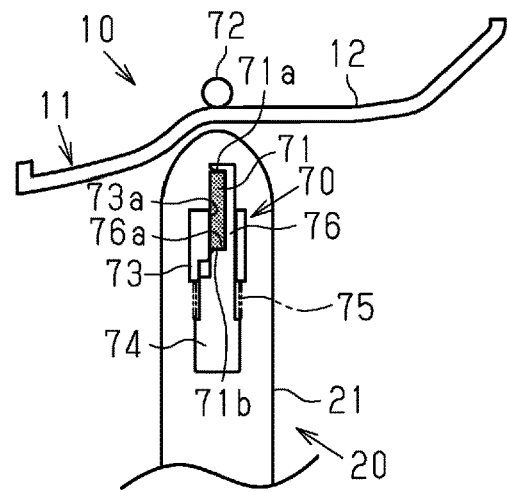
FIG. 17 is a schematic diagram showing a state in which the visor main body shown in FIG. 12 is in the use position.

When the lid 23 moves to the open position as shown in FIGS. 16 and 17, the lid 23 contacts the curved surface 74b of the movable body 74. When the lid 23 moves to the open position, the lid 23 contacts the curved surface 74b of the movable body 74, and pushes the movable body 74 toward the inductive switch 72 against the urging force of the urging portion 75. This moves the magnet 71 toward the inductive switch 72.

Figure 18:
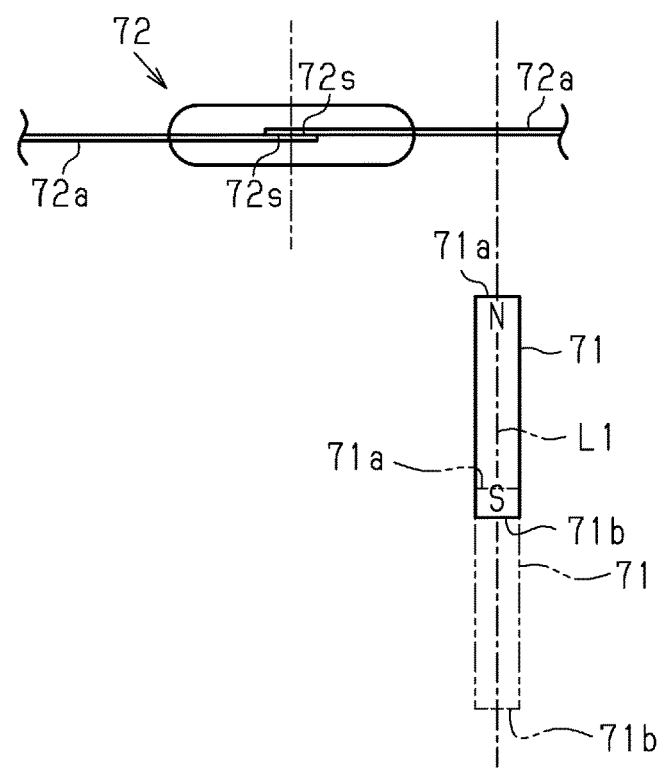
FIG. 18 is a schematic diagram showing a positional relationship between a magnet and an inductive switch shown in FIG. 12.

As shown in FIG. 18, the inductive switch 72 is a normally-open reed switch that is set to the ON state when a magnetic field acts on the inductive switch 72, and set to the OFF state when a magnetic field stops acting on the inductive switch 72. Specifically, the inductive switch 72 includes two reeds 72a. Each reed 72a has a contact 72s. The inductive switch 72 is set to the ON state when the contacts 72s of the reeds 72a are in contact with each other. The inductive switch 72 is set to the OFF state when the contacts 72s of the reeds 72a separate from each other.

FIG. 18 shows a positional relationship between the magnet 71 and the inductive switch 72 when the visor main body 21 is in the use position. When the visor main body 21 is in the use position, the magnet 71 is provided in a position that corresponds to one of the two reeds 72a as shown in FIG. 18. When the visor main body 21 is in the use position, an axis L1 of the magnet 71 intersects with part of the inductive switch 72. Specifically, the axis L1 of the magnet 71 intersects with one of the two reeds 72a.

It is assumed in an example that the movable body 74 is pushed by the lid 23 with the visor main body 21 being in the use position. Then, the magnet 71 approaches one of the two reeds 72a as shown in FIG. 18. At this time, the first end 71a of the magnet 71 is closer to the inductive switch 72 than the second end 71b of the magnet 71. The magnet 71 is close to one of the two reeds 72a. Accordingly, one of the two reeds 72a is magnetized, so that one of the two reeds 72a magnetically attracts the other reed 72a. As a result, the contacts 72s of the reeds 72a contact each other, so that the inductive switch 72 is set to the ON state.

Thus, when the visor main body 21 is in the use position, the lid 23 pushes the magnet 71 against the urging force of the urging portion 75 as the lid 23 moves to the open position. Then, the magnet 71 approaches the inductive switch 72, so as to set the inductive switch 72 to the ON state. When the lid 23 is in the closed position, the urging force of the urging portion 75 moves the magnet 71 to the original position (i.e. the position before being pushed by the lid 23). Then, the magnet 71 moves away from the inductive switch 72, so as to set the inductive switch 72 to the OFF state. Therefore, the magnet 71 sets the inductive switch 72 to the ON state when the visor main body 21 is in the use position and the lid 23 is in the open position.

Figure 19:
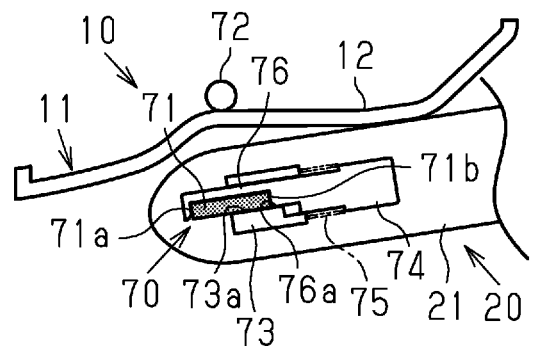
FIG. 19 is a schematic diagram showing a state in which the visor main body in FIG. 12 is in a retracted position.

It is assumed in an example that the visor main body 21 is in the retracted position with the lid 23 remaining in the open position as shown in FIG. 19. In this case, the magnet 71 rotates integrally with the visor main body 21, changing the orientation of the magnet 71 with respect to the inductive switch 72.

Figure 20:
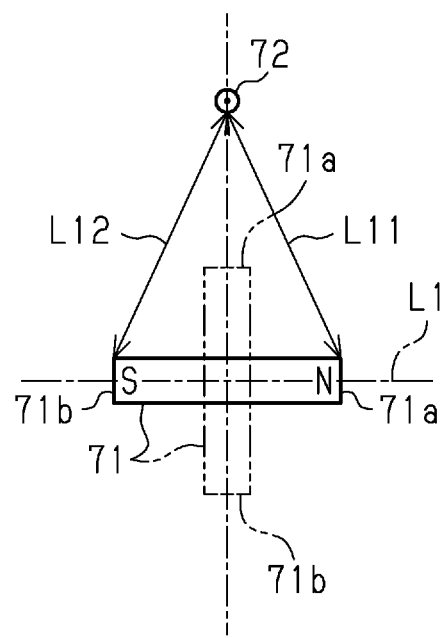
FIG. 20 is a schematic diagram showing a positional relationship between a magnet and an inductive switch shown in FIG. 12.

FIG. 20 shows a positional relationship between the magnet 71 and the inductive switch 72 when the visor main body 21 is in the retracted position. When the visor main body 21 is in the retracted position as shown in FIG. 20, the axis L1 of the magnet 71 does not intersect with the inductive switch 72. A distance L11 between the first end 71*a* of the magnet 71 and the inductive switch 72 and a distance L12 between the second end 71*b* of the magnet 71 and the inductive switch 72 are equal to each other. Accordingly, one of the two reeds 72*a* stops being magnetized, so that one of the two reeds 72*a* stops magnetically attracting the other reed 72*a*. As a result, the contacts 72*s* of the reeds 72*a* separate from each other, so that the inductive switch 72 is set to the OFF state. In this manner, the magnet 71 sets the inductive switch 72 to the OFF state when at least the visor main body 21 is in the retracted position.

With the above-described configuration, when the visor main body 21 is in the use position, and the lid 23 is in the open position, the magnet 71 sets the first inductive switch 72 to the ON state, so that the lighting device 15 is turned on. Accordingly, the lighting device 15 is turned off by moving at least the visor main body 21 to the retracted position so that the magnet 71 sets the inductive switch 72 to the OFF state. Thus, for example, even if the lid 23 is not in the closed position, the lighting device 15 is turned off if the visor main body 21 is in the retracted position. This prevents the lighting device 15 from being left on unintentionally, and thus saves energy. The inductive switch 72 can be switched between the ON state and the OFF state by using the single magnet 71 and the single inductive switch 72.

It is assumed in an example that two magnets are used to switch an inductive switch between the ON state and the OFF state. In this example, when the visor main body 21 pivots between the use position and the retracted position, neither of the magnetic fields produced by the magnets reach the inductive switch in some cases, depending on the arrangement of the magnets. Further, in a case in which two magnets are used, the inductive switch may fail to operate properly due to interference between the magnetic fields produced by the magnets. However, if the magnetic switch 70 of the above-described configuration is used, the inductive switch 72 can be switched between the ON state and the OFF state by using the single magnet 71 and the single inductive switch 72. This eliminates drawbacks caused by using two magnets as described above.

Also, when the visor main body 21 is in the use position, the inductive switch 72 can be switched between the ON state and the OFF state simply by switching the lid 23 between the open position and the closed position. Thus, for example, since the lid 23 does not need to be provided with the magnet 71, the structure of the lid 23 is simplified.

A shielding member may be arranged between a magnet and an inductive switch, so as to shield the magnetic field produced by the magnet, thereby putting the inductive switch to the OFF state. If the shielding member is provided integrally, for example, with the lid 23, the shielding member and the lid 23 are allowed to slide integrally in the visor main body 21. This configuration is barely feasible since, inside the visor main body 21, other components cannot be arranged within a movement region of the shielding member, which slides together with the lid 23. In contrast, in the magnetic switch 70 of the above-described configuration, the moving direction of the movable body 74 is orthogonal to the direction in which the lid 23 slides along the slide mechanism 27. Thus, there are few restrictions on arrangement of other components in the visor main body 21, which increases the flexibility in the layout of the components.

A configuration in which a shielding member slides integrally with the lid 23 may have an influence on the structure of the slide mechanism 27. However, in the magnetic switch 70 of the above-described configuration, the moving direction of the movable body 74 is orthogonal to the direction in which the lid 23 slides along the slide mechanism 27. This configuration has little influence on the structure of the slide mechanism 27. Thus, changes to the configuration of the slide mechanism 27 are minimized.

In a configuration in which a shielding member slides integrally with the lid 23, the size of the lid 23, which includes the shielding member, tends to be large in relation to the opening 21*h*. This may add constraints to the procedure in which the lid 23 is attached to the visor main body 21. Also, if the shielding member is a component separate from the lid 23, a means of connecting the shielding member to the lid 23 is necessary. However, in the magnetic switch 70 of the above-described configuration, the lid 23 can have an existing configuration. This adds no constraints to the procedure in which the lid 23 is attached to the visor main body 21.

In a configuration in which a shielding member slides integrally with the lid 23, the shielding member must not shield the magnetic field produced by the magnet 71, and the magnet 71 and the inductive switch 72 must be located on a single line when the lid 23 is in the open position. This configuration limits timing at which the lighting device 15 is turned on or off. In contrast, the above-described magnetic switch 70 always arranges the magnet 71 in a position in the visor main body 21 that corresponds to the inductive switch 72 regardless of the position in the lid 23 in relation to the visor main body 21. The arrangement of the magnetic switch 70 and the inductive switch 72 thus can be adjusted easily, allowing the timing at which the lighting device 15 is turned on or off to be adjusted.

In the embodiment shown in FIGS. 12 to 20, the shape of the magnet 71 does not necessarily need to have a shape of a quadrangular prism, but may have a shape of a column or a shape of a polygonal prism.

In the embodiment shown in FIGS. 12 to 20, the magnetic switch 70 may be incorporated in the visor main body 21 with the casing 73 integrated with the visor main body 21.

In the embodiment shown in FIGS. 12 to 20, the insertion hole 73*a* of the casing 73 does not necessarily need to have a rectangular shape, but may have any shape as long as the insertion hole 73*a* does not hinder movement of the magnet 71.

In the embodiment shown in FIGS. 12 to 20, the movable body 74 may have a flat inclined surface in place of the curved surface 74*b*.

In the embodiment shown in FIGS. 12 to 20, the urging portion 75 is not limited to a compression spring, but may be a metal spring or an elastic member made of a plastic. In short, the urging portion 75 may have any configuration as long as it urges the movable body 74 away from the casing 73. That is, the urging portion 75 may have any configuration as long as it urges the movable body 74 away from the inductive switch 72.

In the above-described embodiments, the visor main body 21 does not necessarily need to include the third magnet 43. In this case, the arrangement of the first inductive switch 31 and the first magnet 41 must be adjusted such that the first inductive switch 31 is located within the range of the magnetic field produced by the first magnet 41.

In the above-described embodiments, the vehicle sun visor module 10 may be configured such that the garnish portion 11 does not include the second inductive switch 32, and the vehicle sun visor 20 does not include the second magnet 42.

In the above-described embodiments, the vehicle sun visor module 10 may be configured such that the garnish portion 11 does not include the first inductive switch 31, and the vehicle sun visor 20 does not include the first magnet 41.

In the above-described embodiments, the lid 23 does not necessarily need to be allowed to slide with respect to the visor main body 21 by the slide mechanism 27. For example, the lid 23 may be pivotal with respect to the visor main body 21. In this case, the lid 23 pivots with respect to the visor main body 21, so that the lid 23 is movable between the open position, in which the lid 23 exposes the mirror 22, and the closed position, in which the lid 23 covers the mirror 22.

In the above-described embodiments, the vehicle sun visor module 10 does not necessarily need to include the garnish portion 11. In other words, it suffices if a ceiling component that forms at least part of the ceiling includes the lighting device 15, the first inductive switch 31, and the second inductive switch 32. In this case, the ceiling component may be a ceiling roof that forms the entire ceiling. In a case in which the ceiling component is a ceiling roof, the ceiling roof forms part of the vehicle sun visor module 10.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle sun visor module, comprising:
a ceiling component that forms at least part of a ceiling of a vehicle; and
a vehicle sun visor that is arranged to be adjacent to the ceiling component, wherein the vehicle sun visor includes:
a visor main body configured to be pivotal relative to the ceiling component between a use position and a retracted position; and
a mirror attached to the visor main body,
the ceiling component includes:
a lighting device that is configured to radiate light into a passenger compartment; and
an inductive switch that is configured to turn on the lighting device when set to an ON state and to turn off the lighting device when set to an OFF state,
the vehicle sun visor includes:
a magnet that is configured to switch the inductive switch between the ON state and the OFF state; and
a lid that is configured to move relative to the visor main body between an open position, in which the lid exposes the mirror, and a closed position, in which the lid covers the mirror,
the inductive switch includes a first inductive switch,
the magnet includes a first magnet, and
the first magnet is configured such that, when the lid is in the open position, the first magnet sets the first inductive switch to the ON state, and when the lid is in the closed position, the first magnet sets the first inductive switch to the OFF state.

2. The vehicle sun visor module according to claim 1, wherein
the inductive switch includes a second inductive switch,
the magnet includes a second magnet,
the second magnet is configured such that, when the visor main body is in the use position, the second magnet sets the second inductive switch to the ON state, and when the visor main body is in the retracted position, the second magnet sets the second inductive switch to the OFF state, and
the lighting device is configured such that
the lighting device is turned on when both the first inductive switch and the second inductive switch are set to the ON state, and
the lighting device is turned off when at least one of the first inductive switch and the second inductive switch is set to the OFF state.

3. The vehicle sun visor module according to claim 2, wherein the first magnet is provided in the lid.

4. The vehicle sun visor module according to claim 3, wherein
the magnet includes a third magnet,
the third magnet is configured to produce a magnetic field that sets the first inductive switch to the ON state,
the first magnet is configured such that
when the lid is in the open position, the first magnet is away from the magnetic field produced by the third magnet so as to set the first inductive switch to the ON state, and
when the lid is in the closed position, the first magnet cancels the magnetic field produced by the third magnet so as to set the first inductive switch to the OFF state.

5. The vehicle sun visor module according to claim 1, wherein the first magnet is provided in the lid.

6. The vehicle sun visor module according to claim 1, wherein
the first magnet is provided in a position in the visor main body that corresponds to the first inductive switch,
the visor main body includes an urging portion that urges the first magnet away from the first inductive switch,
the lid is configured such that, as the lid moves toward the open position, the lid pushes the first magnet toward the first inductive switch against an urging force of the urging portion,
the first inductive switch is configured to be set to the ON state when the first magnet approaches the first inductive switch,
the first magnet is configured such that, when the lid is in the closed position, the first magnet is moved by the urging force of the urging portion to an original position, the original position being a position before being pushed by the lid, and the first inductive switch is configured to be set to the OFF state when the first magnet separates from the first inductive switch.

7. A vehicle sun visor module, comprising:

a ceiling component that forms at least part of a ceiling of a vehicle; and a vehicle sun visor that is arranged to be adjacent to the ceiling component, wherein the vehicle sun visor includes:
   a visor main body configured to be pivotal relative to the ceiling component between a use position and a retracted position; and
   a mirror attached to the visor main body, the ceiling component includes:
   a lighting device that is configured to radiate light into a passenger compartment; and
   an inductive switch that is configured to turn on the lighting device when set to an ON state and to turn off the lighting device when set to an OFF state, the vehicle sun visor includes:
   a magnet that is configured to switch the inductive switch between the ON state and the OFF state; and
   a mechanical switch that is configured to move the magnet toward and away from the inductive switch, and the magnet is configured such that, when the mechanical switch is manipulated, the magnet switches the inductive switch between the ON state and the OFF state.

8. A vehicle sun visor module, comprising:

a ceiling component that forms at least part of a ceiling of a vehicle; and a vehicle sun visor that is arranged to be adjacent to the ceiling component, wherein the vehicle sun visor includes:
   a visor main body configured to be pivotal relative to the ceiling component between a use position and a retracted position; and
   a mirror attached to the visor main body, the ceiling component includes:
   a lighting device that is configured to radiate light into a passenger compartment; and
   an inductive switch that is configured to turn on the lighting device when set to an ON state and to turn off the lighting device when set to an OFF state, the vehicle sun visor includes a magnet that is configured to switch the inductive switch between the ON state and the OFF state, the ceiling component includes only one of the inductive switch, the vehicle sun visor includes only one of the magnet, the vehicle sun visor includes a lid that is configured to move relative to the visor main body between an open position, in which the lid exposes the mirror, and a closed position, in which the lid covers the mirror, the magnet is configured to
   set the inductive switch to the ON state when the visor main body is in the use position and the lid is in the open position, and
   set the inductive switch to the OFF state when at least the visor main body is in the retracted position.

9. The vehicle sun visor module according to claim 8, wherein the magnet is provided in a position in the visor main body that corresponds to the inductive switch, the visor main body includes an urging portion that urges the magnet away from the inductive switch, the lid is configured such that, when the visor main body is in the use position, the lid pushes the magnet against an urging force of the urging portion as the lid moves toward the open position, the inductive switch is configured to be set to the ON state when the magnet approaches the inductive switch, the magnet is configured such that, when the lid is in the closed position, the magnet is moved by the urging force of the urging portion to an original position, the original position being a position before being pushed by the lid, and the inductive switch is configured to be set to the OFF state when the magnet separates from the inductive switch.

* * * * *